(12) United States Patent
Huang et al.

(10) Patent No.: US 11,867,667 B2
(45) Date of Patent: Jan. 9, 2024

(54) NON-DESTRUCTIVE TESTING METHOD FOR ELASTIC MODULUS OF FINE CERAMIC, APPARATUS, AND STORAGE MEDIUM

(71) Applicants: DONGGUAN CITY WONDERFUL CERAMICS INDUSTRIAL PARK CO., LTD., Guangdong (CN); JIANGXI HEMEI CERAMICS CO., LTD., Jiangxi (CN); GUANGDONG JIAMEI CERAMICS CO., LTD, Guangdong (CN)

(72) Inventors: Jianping Huang, Dongguan (CN); Yuezeng Xie, Dongguan (CN); Kehui Lin, Dongguan (CN); Hailong Yu, Dongguan (CN)

(73) Assignees: DONGGUAN CITY WONDERFUL CERAMICS INDUSTRIAL PARK CO., LTD., Dongguan (CN); JIANGXI HEMEI CERAMICS CO., LTD., Yichun (CN); GUANGDONG JIAMEI CERAMICS CO., LTD., Qingyuan (CN)

(*) Notice: Subject to any disclaimer, the term of this patent is extended or adjusted under 35 U.S.C. 154(b) by 412 days.

(21) Appl. No.: 17/421,603

(22) PCT Filed: Mar. 18, 2020

(86) PCT No.: PCT/CN2020/079916
§ 371 (c)(1),
(2) Date: Jul. 8, 2021

(87) PCT Pub. No.: WO2021/184240
PCT Pub. Date: Sep. 23, 2021

(65) Prior Publication Data
US 2022/0341830 A1    Oct. 27, 2022

(51) Int. Cl.
*G01N 29/07* (2006.01)
*G01N 3/52* (2006.01)

(52) U.S. Cl.
CPC .............. *G01N 3/52* (2013.01); *G01N 29/07* (2013.01)

(58) Field of Classification Search
CPC ................................ G01N 3/52; G01N 29/07
See application file for complete search history.

(56) References Cited

U.S. PATENT DOCUMENTS 5,841,019 A    11/1998  Drabrin et al.
2019/0178765 A1  6/2019  Saleem

FOREIGN PATENT DOCUMENTS

CN    1712961 A  *  12/2005
CN    1712961 A     12/2005
(Continued)

OTHER PUBLICATIONS

Second Examination Report dated Dec. 13, 2022, in corresponding Japanese Application No. 2021540540, 5 pages.
(Continued)

*Primary Examiner* — Jamel E Williams
(74) *Attorney, Agent, or Firm* — Maier & Maier, PLLC (57) ABSTRACT

A non-destructive testing method for an elastic modulus of fine ceramic, an apparatus, and a storage medium, including controlling intact fine ceramic to enter a first testing position, fixing the test sample, controlling an ultrasonic testing instrument to be adjusted to a position of the sample, performing ultrasonic testing e, and collecting testing data; adjusting the sample to a second testing position, performing resilience testing on the sample, and collecting resilience data; building a data model according to the testing data, or substituting the testing data into the pre-built data model to obtain elastic modulus characterization data of the test (Continued)

sample. The test sample does not need to be cut into small-size test samples and is not destroyed, and the intact fine ceramic is subjected to non-destructive testing. The accuracy of tested data is improved, damage to the test sample is also avoided, and reuse of the sample is realized.

10 Claims, 2 Drawing Sheets

(56) References Cited

FOREIGN PATENT DOCUMENTS

| CN | 104251882 | A | * | 12/2014 | | |
| CN | 104251882 | A | | 12/2014 | | |
| CN | 105352831 | A | | 2/2016 | | |
| CN | 105842076 | A | | 8/2016 | | |
| CN | 105842076 | A | * | 8/2016 | | |
| CN | 109142050 | A | | 1/2019 | | |
| CN | 109142050 | A | * | 1/2019 | ............. | G01N 25/00 |
| CN | 109891224 | A | * | 6/2019 | ......... | G01B 11/0625 |
| CN | 110672822 | A | | 1/2020 | | |
| CN | 110672822 | A | * | 1/2020 | ............ | G01N 21/88 |
| JP | 2019194605 | A | | 11/2019 | | |

OTHER PUBLICATIONS

Rongcheng, "Research on Strength Inspecting Technique for High Strength Concrete by Rebound Method and Ultrasonic-Rebound Combined Method", Key Engineering Materials, vols. 629-630, 2015, pp. 600-605.

Translation of International Search Report dated Dec. 25, 2020 in corresponding International Application No. PCT/CN2020/079916; 3 pages.

* cited by examiner

NON-DESTRUCTIVE TESTING METHOD FOR ELASTIC MODULUS OF FINE CERAMIC, APPARATUS, AND STORAGE MEDIUM

TECHNICAL FIELD

The present disclosure relates to the technical field of testing of an elastic modulus of fine ceramic, and particularly relates to a non-destructive testing method for an elastic modulus of fine ceramic, an apparatus, and a storage medium.

BACKGROUND

For characterization of elastic moduli of fine ceramic materials, destructive testing measures or methods are mainly used at present. Most of existing testing devices for the elastic modulus of a fine ceramic material are not suitable for large-size test samples. The testing can be carried out only by machining a test sample to an appropriate size. That is, the fine ceramic material itself needs to be cut, and then a small-size material obtained by cutting is tested, which causes that the large-size product is destroyed and that the sample to be tested cannot be reused after the destructive testing, resulting in great waste. In addition, such destructive testing will destroy the performance of the material. Compared with the performance of the material, test results may have large testing errors, which cannot truly characterize the elastic modulus of the material.

Therefore, the prior art has defects and needs to be improved and developed.

SUMMARY

The technical problem to be solved by the present disclosure is to provide a non-destructive testing method for an elastic modulus of fine ceramic, an apparatus, and a storage medium for the above-mentioned defects in the prior art. The present disclosure is directed to solve the problems in the prior art that large-size fine ceramic would be destroyed during testing of the elastic modulus and cannot be reused, and tested data also has a larger error.

The technical solution used by the present disclosure to solve the technical problems is as follows: a non-destructive testing method for an elastic modulus of fine ceramic, including:

controlling intact fine ceramic to enter a first testing position, fixing the test sample, controlling an ultrasonic testing instrument to be adjusted to a specified position of the test sample, performing ultrasonic testing on the test sample, and collecting ultrasonic testing data;

adjusting the test sample to a second testing position, performing resilience testing on the test sample, and collecting resilience testing data;

building a data model according to the ultrasonic testing data and the resilience testing data, or substituting the ultrasonic testing data and the resilience testing data into the pre-built data model to obtain elastic modulus characterization data of the test sample.

Further, before controlling the intact fine ceramic to enter the first testing position, fixing the test sample, controlling the ultrasonic testing instrument to be adjusted to the specified position of the test sample, performing ultrasonic testing on the test sample, and collecting the ultrasonic testing data, the method further includes:

pre-constructing an ultrasonic and resilience two-parameter-based non-destructive testing system for an elastic modulus of fine ceramic;

the non-destructive testing system for an elastic modulus of fine ceramic includes an automatic control and testing mechanism and a data processing mechanism; and the automatic testing mechanism includes a sample installation component and a resilience testing component.

Further, the step of controlling the intact fine ceramic to enter the first testing position, fixing the test sample, controlling the ultrasonic testing instrument to be adjusted to the specified position of the test sample, performing ultrasonic testing on the test sample, and collecting the ultrasonic testing data specifically includes:

putting the fine ceramic into the sample installation component for fixing, controlling an ultrasonic transmitter and an ultrasonic receiver of the ultrasonic testing instrument to be adjusted onto testing points of two opposite side surfaces of the fine ceramic;

connecting the ultrasonic testing instrument to the data processing mechanism in a communication manner, testing time difference, wave velocity and amplitude data at the signal receiving moments of the transmitting probe and the receiving probe of the ultrasonic testing instrument, and collecting the time difference, wave velocity and amplitude data serving as ultrasonic testing data;

performing ultrasonic testing on points to be tested on all the side surfaces of the test sample.

Further, the test sample is adjusted to the second testing position, resilience testing is performed on the test sample, and resilience testing data is collected;

the fine ceramic is adjusted to a position located on the same horizontal plane as a resilience testing rod of the resilience testing component;

testing points are arranged at an equal interval on a center line of each side surface of the fine ceramic in a thickness direction;

the resilience testing rod is controlled to be perpendicular to the testing points to test resilience values of all the testing points, and the resilience testing data of all the side surfaces of the test sample is collected.

Further, the step of building the data model according to the ultrasonic testing data and the resilience testing data, or substituting the ultrasonic testing data and the resilience testing data into the pre-built data model to obtain the elastic modulus characterization data of the test sample specifically includes:

the automatic control and testing mechanism obtaining the ultrasonic testing data and the resilience testing data, and recording the data into the data processing mechanism.

Further, the test sample is pretreated before testing, and the step of pretreatment includes:

selecting at least 5 groups of test samples with different mechanical properties from fine ceramic to be tested, each group including at least 8 fine ceramic test samples with the mechanical properties, and placing the selected test samples into an environment with a temperature of 20° C.±2° C. and a relative humidity of 60%±5% for standing and curing for 48 h to obtain test samples.

Ultrasonic testing and resilience testing of each test sample specifically include steps of:

uniformly selecting, in advance, at least 8 testing points that are distributed at an equal interval on each side surface of each test sample;

performing ultrasonic testing once on the testing points to obtain an ultrasonic width-direction velocity $V_L$ and an ultrasonic thickness-direction velocity $V_h$ of each testing point;

performing resilience testing once on the testing points to obtain each resilience value R;

taking a mean value of the read ultrasonic width-direction velocities $V_L$ as an ultrasonic width-direction velocity effective value of the test samples, taking a mean value of the ultrasonic thickness-direction velocities $V_h$ as an ultrasonic thickness-direction velocity effective value of the test samples, and taking a mean value of the resilience values R as a resilience effective value of the test samples.

Further, the data model is $$E = A\left(\frac{V_L}{V_h}\right)^B \cdot R^C$$

where,

E is the elastic modulus, the unit of which is GPa;

A is a coefficient factor, a value range of which is $e^{1.1}$-$e^{3.4}$;

B is a sound wave factor, a value range of which is 0-2.7;

C is a resilience factor, a value range of which is 0-1.0;

$V_L$ is the ultrasonic width-direction velocity, the unit of which is m/s;

$V_h$ is the ultrasonic thickness-direction velocity, the unit of which is m/s;

R is the resilience value.

Further, the non-destructive testing method for elastic modulus of fine ceramic further includes:

performing testing according to the grades of the mechanical property to form a regression analysis sample, and fitting and creating a relation curve of resilience-ultrasonic for testing the elastic modulus of the fine ceramic;

using the built data model according to the obtained resilience effective value and the ultrasonic effective values to perform calculation and analysis to obtain the elastic modulus E;

obtaining an effective numerical value of the elastic modulus E of each test sample in each group, and taking an arithmetic mean value as the elastic modulus E' of the group of test samples.

Another technical solution adopted by the present disclosure to solve the technical problems is as follows: an apparatus, which includes a memory, a processor, and a non-destructive testing program for an elastic modulus of fine ceramic that is stored on the memory and may be operated on the processor. The non-destructive testing program for elastic modulus of fine ceramic, when executed by the processor, realizes the steps of the above-mentioned non-destructive testing method for an elastic modulus of fine ceramic.

A further technical solution adopted by the present disclosure to solve the technical problems is as follows: a storage medium. The storage medium stores a computer program which can be executed to implement the above-mentioned non-destructive testing method for an elastic modulus of fine ceramic.

Beneficial effects: According to the non-destructive testing method for an elastic modulus of fine ceramic, the apparatus, and the storage medium, the non-destructive testing method for an elastic modulus of fine ceramic includes: controlling the intact fine ceramic to enter the first testing position, fixing the test sample, controlling the ultrasonic testing instrument to be adjusted to the specified position of the test sample, performing ultrasonic testing on the test sample, and collecting ultrasonic testing data; adjusting the test sample to the second testing position, performing resilience testing on the test sample, and collecting resilience testing data; and building the data model according to the ultrasonic testing data and the resilience testing data, or substituting the ultrasonic testing data and the resilience testing data into the pre-built data model to obtain the elastic modulus characterization data of the test sample. The test sample in the present disclosure does not need to be cut into small-size test samples and will not be destroyed; the intact fine ceramic is directly subjected to non-destructive testing, so that the material itself cannot be destroyed, the accuracy of the tested data is improved, damage to the test sample is also avoided, and reuse of the test sample is realized.

DETAILED DESCRIPTION OF THE EMBODIMENTS

To make the objectives, technical solutions and advantages of the present disclosure clearer, the present disclosure is further described below in detail with reference to accompanying drawings and embodiments. It should be understood that the specific embodiments described here are merely to explain the present disclosure, and not intended to limit the present disclosure.

Testing for an elastic modulus of fine ceramic mainly refers to a destructive testing method stipulated in the standards GB/T6569-2006 "Fine Ceramics (advanced Ceramics, advanced Technical Ceramics)—Test Method for Flexural Strength of Monolithic Ceramics At Room Temperature" and GB/T10700-2006 "Test Methods for Elastic Moduli of Fine Ceramics (advanced ceramics, advanced technical ceramics)". A non-destructive testing method has not been widely accepted at home and abroad to characterize the elastic modulus. For a fine ceramic material having an upper surface area larger than or equal to 1.62 $m^2$, the existing testing method has problems in the following several aspects in an actual operation process:

(1) Most of existing testing devices for the elastic modulus of a fine ceramic material are not suitable for large-size test samples (such as a fine ceramic plate having an upper surface area larger than or equal than 1.62 $m^2$). The testing can be carried out only by machining a test sample to an appropriate size. That is, for large-size fine ceramic, an original test sample needs to be cut to prepare samples, which has destroyed the elastic modulus of the original fine ceramic. For some fine ceramic with ultra-high strength, their elastic moduli cannot be accurately characterized even if a destructive method is used for testing due to the restriction of the natural ability of a testing device.

(2) In a traditional destructive test for testing the elastic modulus, samples are selected for testing by a sampling method such as random sampling and systematic sampling;

their test data is used as real strength indicators of a batch of materials and has a certain probability or error.

(3) Most of existing testing devices are not suitable for large-size plates (such as a ceramic plate having an upper surface area larger than or equal to 1.62 m$^2$), and the testing for the elastic modulus is in accordance with the requirements stipulated in GB/T10700-2006 "Test Methods for Elastic Moduli of Fine Ceramics (advanced ceramics, advanced technical ceramics)". Test samples of stipulated sizes need to be prepared. Moreover, the size of a test sample requires higher accuracy, and the sample preparation process is complicated and tedious, has higher requirements for manual operations and device accuracy, and is greatly affected by sample preparation process conditions or processes. Compared with the intrinsic performance of the material, the test result may have a larger testing error, so that the elastic modulus of the material cannot be really characterized.

(4) After a destructive test, a sample to be tested cannot be reused, resulting in great waste. For a large-size fine ceramic material, greater waste will be caused.

The present disclosure provides a non-destructive testing method for an elastic modulus of fine ceramic, an apparatus, and a storage medium. An ultrasonic-resilience method is used to test an elastic modulus of an inorganic non-metal plate, and a non-destructive testing model for ultrasonic and resilience parameters and an elastic modulus of a non-metal material is built. Moreover, the following problems are solved:

First, the problems of waste of resources, environmental pollution and economical loss caused by the fact that the material will no longer be used and become a waste after traditional fine ceramic is subjected to destructive elastic modulus testing are solved.

Second, during elastic modulus testing of the traditional fine ceramic, a standard test sample that meets a specified size requirement needs to be prepared if the product is of an irregular size or a larger size. The present disclosure solves the problems that the whole testing process is tedious and the testing period is long, and avoids the influence caused by a non-standard machined and treated test sample; moreover, a large-size test sample is subjected to non-destructive testing without being cut or subjected to other destructive preparation, so that the accuracy of the elastic modulus of the fine ceramic is guaranteed.

Third, the non-destructive testing method adopted in the present disclosure can enlarge the sample capacity, and even realize 100% sampling inspection, thereby solving the problem that test samples are not representative enough for the overall performance of a product because of a small number of test samples for sampling inspection, and realizing testing of the product that has been put into operation.

The method of the present disclosure can directly test the elastic modulus of a material without destroying the original characteristics of the material, so that the accuracy of a test result is guaranteed, and the tested material can be ensured to be normally used. The method has a positive facilitation function for quality control in a production process and selection and quality monitoring for materials in a use process, and is of positive significance for pushing the industrial technology to progress.

Figure 1:
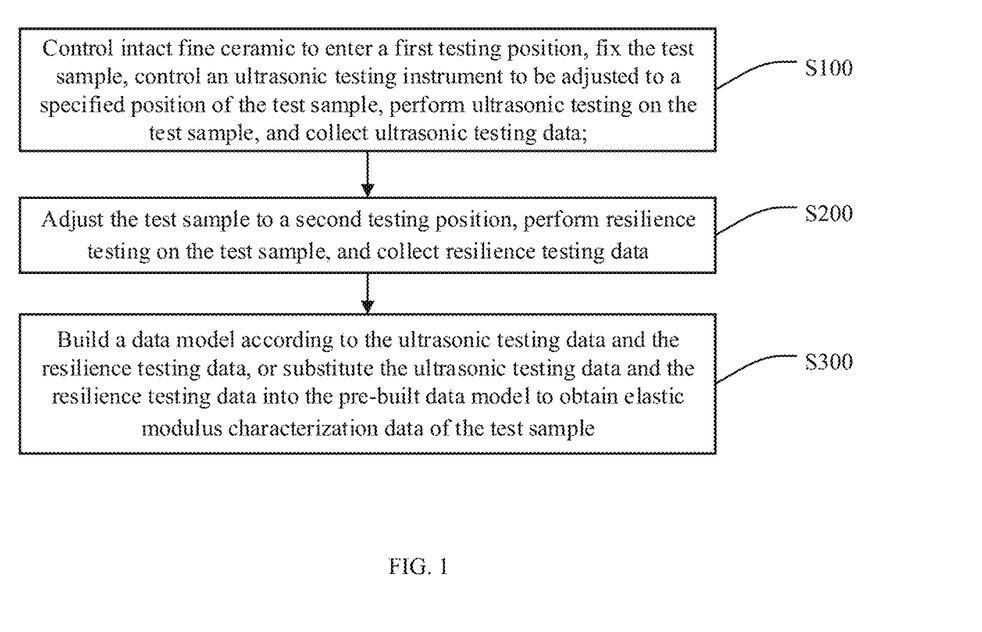
FIG. 1 is a flow diagram of a preferred embodiment of a non-destructive testing method for an elastic modulus of fine ceramic in the present disclosure.

Referring to FIG. 1, FIG. 1 is a flow diagram of a non-destructive testing method for an elastic modulus of fine ceramic provided by the present disclosure. The non-destructive testing method for an elastic modulus of fine ceramic includes:

S100, intact fine ceramic is controlled to enter a first testing position and is fixed; an ultrasonic testing instrument is controlled to be adjusted to a specified position of the test sample, ultrasonic testing is performed on the test sample, and ultrasonic testing data is collected.

In one implementation mode, before the step S100, the method further includes:

S11, an ultrasonic and resilience two-parameter-based non-destructive testing system for an elastic modulus of fine ceramic is pre-built.

The non-destructive testing system for an elastic modulus of fine ceramic includes an automatic control and testing mechanism and a data processing mechanism.

Further, the automatic control and testing mechanism includes a sample installation component and a resilience testing component.

Specifically, the present disclosure firstly builds the ultrasonic and resilience two-parameter-based non-destructive testing system for an elastic modulus of fine ceramic. The system includes: the automatic control and testing mechanism and the data processing mechanism. The automatic testing module includes a sample installation component and the testing component.

It can be understood that in the non-destructive testing method for an elastic modulus of fine ceramic provided in the present disclosure, fine ceramic to be tested is not subjected to any cutting treatment.

That is to say, the intact fine ceramic refers to fine ceramic of any shape and any size, and is directly subjected to elastic modulus testing. Therefore, the accuracy of the elastic modulus testing for the fine ceramic is effectively guaranteed; and the fine ceramic test sample will not be destroyed, so that the waste of resources occurring after the fine ceramic test sample is tested is avoided.

It should be emphasized that the first testing position is a position to perform ultrasonic data testing. During the testing, the intact fine ceramic test sample is firstly put into the sample installation component, and the sample installation component controls the test sample to enter the first testing position.

In one preferred embodiment, the step S100 specifically includes:

Step S110, the fine ceramic is put into the sample installation component for fixing, and an ultrasonic transmitter and an ultrasonic receiver of the ultrasonic testing instrument are controlled to be adjusted onto testing points of two opposite side surfaces of the fine ceramic;

Step S120, the ultrasonic testing instrument is connected to the data processing mechanism in a communication manner; time difference, wave velocity and amplitude data at the signal receiving moments of the transmitting probe and the receiving probe of the ultrasonic testing instrument are tested; and the time difference, wave velocity and amplitude data serving as ultrasonic testing data are collected;

Step S130, ultrasonic testing is performed on points to be tested on all the side surfaces of the test sample.

Figure 2:
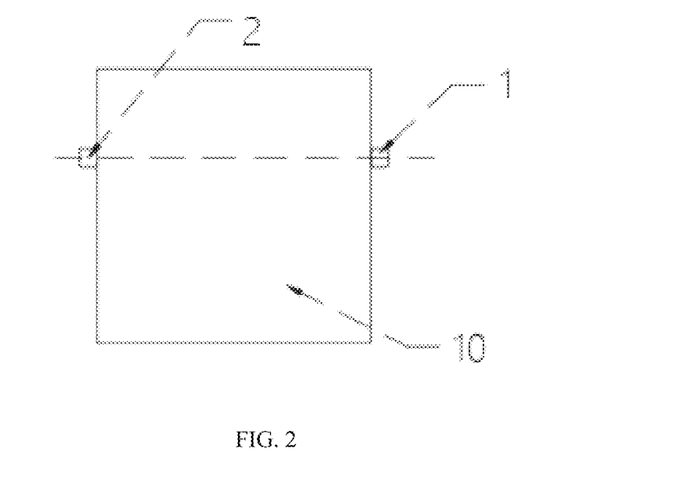
FIG. 2 is a flow diagram of ultrasonic testing in a preferred embodiment of a non-destructive testing method for an elastic modulus of fine ceramic in the present disclosure.
Figure 3:
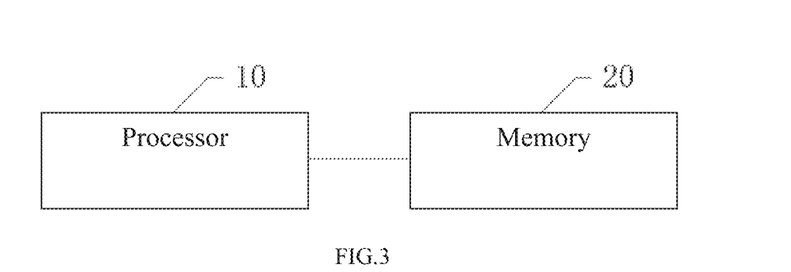
FIG. 3 is a block diagram of a working principle of a preferred embodiment of an apparatus in the present disclosure.

Specifically, as shown in FIG. 2, the test sample 10 is fixed at the first testing position, and the positions of an ultrasonic transmitting probe 1 and an ultrasonic receiving probe 2 of the ultrasonic testing instrument are oppositely disposed in FIG. 3. Step a, the test sample enters the first testing position, and is then fixed. Step b, the ultrasonic testing instrument is subjected to corresponding automatic adjustment to respectively connect the ultrasonic transmitting probe and the ultrasonic receiving probe to two ends of the ultrasonic testing instrument, and the ultrasonic transmitting probe and the ultrasonic receiving probe are adjusted to the testing points of two opposite side surfaces of the test sample; Step c, the ultrasonic testing instrument is connected to the data processing mechanism in a communication manner; the time difference, wave velocity and amplitude data at the signal receiving moments of the transmitting probe and the receiving probe of the ultrasonic testing instrument are tested, and the time difference, wave velocity and amplitude data serving as ultrasonic testing data are collected; finally, thee step b and the step c are repeated to perform the ultrasonic testing on each side surface of the test sample to obtain more ultrasonic testing data of the test sample, which is favorable for further improving the testing accuracy. It should be noted that two testing points should be spaced by at least 20 mm or farther. Moreover, the testing points are uniformly distributed on each side surface, which further improves the testing accuracy.

Step S200, the test sample is adjusted to the second testing position; resilience testing is performed on the test sample; and resilience testing data is collected.

It can be understood that in the present disclosure, during ultrasonic testing and resilience testing, the positions of the sample are different. In some embodiments, the position of the test sample during the resilience testing is generally set at a relatively upper end of the position of the test sample during the ultrasonic testing.

In some preferred embodiments, the step S200 specifically includes:

Step S210, the fine ceramic is adjusted to a position located on the same horizontal plane as the resilience testing rod of the resilience testing component;

Step S220, the testing points are arranged at an equal interval on a center line of each side surface of the fine ceramic in a thickness direction;

Step 230, the resilience testing rod is controlled to be perpendicular to the testing points to test resilience values of all the testing points, and resilience testing data of all the side surfaces of the test sample are collected.

It can be understood that the resilience testing for the test sample is after the ultrasonic testing. After the ultrasonic testing for the test sample is completed, the sample installation component in the automatic control and testing mechanism adjusts the position of the test sample to adjust the fine ceramic to the position located on the same horizontal plane as the resilience testing rod of the resilience testing component. That is, the resilience testing rod is perpendicularly aligned with the equally-spaced testing points arranged on the center lines on the side surfaces of the fine ceramic in the thickness direction; the testing points should be spaced by at least 20 mm or farther, and uniformly distributed on the side surfaces. After the testing points are set, a resiliometer is automatically adjusted and perpendicularly aligned with the testing points of the test sample to perform the resilience value testing on all the testing points on each side surface of the test sample to obtain resilience value parameters, i.e., the resilience testing data, of this side, further improving the testing accuracy.

S300, a data model is built according to the ultrasonic testing data and the resilience testing data, or the ultrasonic testing data and the resilience testing data are substituted into the pre-built data model to obtain elastic modulus characterization data of the test sample.

In one implementation mode, the step S300 specifically includes:

S310, the automatic control and testing module obtains the ultrasonic testing data and the resilience testing data, and records the data into the data processing mechanism;

S320, the data model is built, or the data is substituted into the pre-built data model for formula and corresponding amount conversion to obtain the elastic modulus characterization data of the test sample.

It can be understood that the automatic control and testing mechanism obtains the resilience testing data (the resilience values) and the ultrasonic testing data (ultrasonic width-direction velocities and ultrasonic thickness-direction velocities) of the fine ceramic test sample, and records the data into the data processing mechanism; the data processing mechanism builds the data model according to the resilience testing data and the ultrasonic testing data, or substitutes the resilience testing data and the ultrasonic testing data into the existing data model for formula and corresponding amount conversion, so as to finally obtain the elastic modulus characterization data of the test sample.

In some preferred embodiments, in the non-destructive testing method for an elastic modulus of fine ceramic provided in the present disclosure, before the fine ceramic test sample is subjected to the elastic modulus testing, the test sample needs to be pretreated. It should be noted that the pretreatment for the test sample is not destructive pretreatment, that is, the test sample is not subjected to destructive cutting pretreatment, thereby avoiding the fine ceramic test sample from being destroyed and realizing non-destructive testing of the elastic modulus of the fine ceramic test sample.

Specifically, the step of pretreating the fine ceramic test sample includes: at least 5 groups of test samples with different mechanical properties are selected from fine ceramic to be tested, and each group includes at least 8 fine ceramic test samples with the mechanical properties; the selected test samples are placed into an environment with a temperature of 20° C.±2° C. and a relative humidity of 60%±5% for standing and curing for 48 h to obtain test samples.

That is, during selection of the fine ceramic, at least 5 groups of test samples with different mechanical properties need to be selected, and each group includes at least 8 test samples with the same mechanical property.

After the test samples are selected, each test sample is placed in the environment with the temperature of 20° C.±2° C. and the relative humidity of 60%±5% for standing and curing for 48 h to obtain the test samples capable of being subjected to elastic modulus testing.

It can be understood that the test samples stand in the fixed-temperature and fixed-humidity environment to ensure that the test samples are subjected to the elastic modulus testing in the same states, so that the repetitiveness of elastic modulus test results of the test samples with the mechanical properties is improved. Furthermore, the pretreatment for the test sample is not destructive pretreatment, that is, the test sample is not subjected to destructive cutting pretreatment, thereby avoiding the fine ceramic test sample from being destroyed and realizing non-destructive testing of the elastic modulus of the fine ceramic test sample.

In some other preferred embodiments, the ultrasonic testing and the resilience testing of each test sample specifically include steps of:

at least 8 testing points that are distributed at an equal interval are uniformly selected in advance on each side surface of each test sample;

ultrasonic testing is performed once on the testing points to obtain an ultrasonic width-direction velocity $V_L$ and an ultrasonic thickness-direction velocity $V_h$ of each testing point;

resilience testing is performed once on the testing points to obtain each resilience value R;

a mean value of the read ultrasonic width-direction velocities $V_L$ is taken as an ultrasonic width-direction velocity effective value of the test samples; a mean value of the ultrasonic thickness-direction velocities $V_h$ is taken as an ultrasonic thickness-direction velocity effective value of the test samples; and a mean value of the resilience values R is taken as a resilience effective value of the test samples.

It can be understood that the testing points on the fine ceramic test sample in the present disclosure are uniformly distributed on each side surface, and each testing point is disposed at an equal interval; and moreover, each testing point is subjected to ultrasonic testing and resilience testing only once, so that each surface of the test sample is ensured to be accurately tested, and interference to the test results caused by testing the testing points for multiple times is avoided.

In some preferred embodiments, the data model is $$E = A\left(\frac{V_L}{V_h}\right)^B \cdot R^C$$

where E is the elastic modulus, the unit of which is GPa; A is a coefficient factor, a value range of which is $e^{1.1}$-$e^{3.4}$; B is a sound wave factor, a value range of which is 0-2.7; C is a resilience factor, a value range of which is 0-1.0; $V_L$ is the ultrasonic width-direction velocity, the unit of which is m/s; $V_h$ is the ultrasonic thickness-direction velocity, the unit of which is m/s; and R is the resilience value.

In preferred embodiments, the non-destructive testing method for an elastic modulus of fine ceramic further includes:

testing is performed according to the grades of the mechanical property to form a regression analysis sample, and a relation curve of resilience-ultrasonic for testing the elastic modulus of the fine ceramic is fitted and created;

the built data model is used according to the obtained resilience effective value and the ultrasonic effective values to perform calculation and analysis to obtain the elastic modulus E;

an effective numerical value of the elastic modulus E of each test sample in each group is obtained, and an arithmetic mean value is taken as the elastic modulus E' of the group of test samples.

Specifically, for different fine ceramic materials, testing is performed according to the grades of the mechanical property to form the regression analysis sample, and the relation curve of resilience-ultrasonic for testing the elastic modulus of the fine ceramic material is fitted and created. Data processing is then performed: the effective values of the resilience value R and the ultrasonic propagation velocity V (the ultrasonic width-direction velocity $V_L$ and the ultrasonic thickness-direction velocity $V_h$) of each testing point are obtained in the testing process, and the mean values are respectively taken as the resilience value and the ultrasonic velocity value of the test sample; a regression equation is used for calculation and analysis to obtain the elastic modulus value E; b, an effective numerical value of the elastic modulus value E of each test sample of this group is obtained, and an arithmetic mean value is taken as an elastic modulus representative value E' of the group of test samples.

It can be known that the present disclosure has the following advantages: Firstly, the elastic modulus of a fine ceramic material can be tested without destroying the original texture and shape of the fine ceramic material. Secondly, the present disclosure can obtain a result within short time without destroying the original characteristics of the material for relevant personnel to make a judgment, which is favorable for continuity of production and improves the production efficiency. The material is better put to good use, which lowers the usage risk and reduces the waste of resources. Thirdly, the present disclosure can perform the testing in the use process of the material, evaluate whether the material is destroyed or has reduced strength in the use process or other conditions, and provide an effective evaluation reference for the safety condition of the material in the use process.

One embodiment is exemplified below. Testing steps are as follows:

a, one batch of $Al_2O_3$ fine ceramic test samples having an elastic modulus ranging from 100 GPa to 600 GPa and having the same specification of 150 mm×150 mm are selected;

b, the constructed non-destructive testing system for an elastic modulus of a fine ceramic material is used to perform testing according to the above-mentioned testing method to obtain effective values of resilience values R and ultrasonic velocities $V_L$ and $V_h$. Specific testing steps are:

1) the fine ceramic test samples are put into the sample installation component, and then are fixed, and the test samples are adjusted to an ultrasonic testing position;

2) an ultrasonic transmitting probe 1 and an ultrasonic receiving probe 2 of an ultrasonic testing instrument are respectively connected to two ends of the ultrasonic testing instrument, and the ultrasonic testing instrument is in communication connection to the data collection mechanism; the ultrasonic transmitting probe 1 and the ultrasonic receiving probe 2 are respectively connected to two opposite side surfaces of the test samples to obtain data, such as a time difference, a wave velocity and an amplitude, at the signal receiving moments of the two sensors, and not all the side surfaces of the test samples are subjected to the ultrasonic testing; the ultrasonic testing is completed to obtain data, such as ultrasonic velocities and frequencies;

3) the positions of the test samples are adjusted to a resilience testing position till a resilience testing rod and testing points are located on the same horizontal plane; the testing points are center points of side edges of the test samples in a thickness direction; two testing points should be spaced by at least 20 mm or farther; after the testing points are set, a resiliometer is automatically adjusted and perpendicular to the testing points of the test samples to perform resilience value testing on the testing points on all the surfaces to obtain resilience value parameters of the test samples;

c, the tested test samples are subjected to elastic modulus testing according to the standard GB/T10700-2006 "Test Methods for Elastic Moduli of Fine Ceramics (advanced ceramics, advanced technical ceramics)". Testing data corresponding to the resilience values R, the ultrasonic velocities $V_L$ and $V_h$ and the elastic moduli E of each group of fine ceramic test samples are as shown in Table 1.

TABLE 1

Test results of the resilience values, the ultrasonic velocities and the elastic moduli of $Al_2O_3$ fine ceramic

| Serial number | 1 | 2 | 3 | 4 | 5 | 6 |
|---|---|---|---|---|---|---|
| Resilience value R | 21 | 24 | 26 | 28 | 32 | 34 |
| Ultrasonic propagation velocity (in a thickness direction) m/s | 7255.86 | 7603.57 | 8132.36 | 8830.69 | 8846.86 | 8872.68 |

TABLE 1-continued

Test results of the resilience values, the ultrasonic velocities and the elastic moduli of $Al_2O_3$ fine ceramic

| Serial number | 1 | 2 | 3 | 4 | 5 | 6 |
|---|---|---|---|---|---|---|
| Ultrasonic propagation velocity (in a width direction) m/s | 960.33 | 998.65 | 998.69 | 1004.99 | 1007.18 | 1082.37 |
| Elastic modulus GPa | 183.86 | 207.96 | 218.25 | 254.35 | 299.11 | 328.14 |

A fitting relational equation of the resilience values, the ultrasonic velocities and the elastic moduli of the fine ceramic is:

$$E = A\left(\frac{V_L}{V_h}\right)^B \cdot R^C$$

where

E-elastic modulus, the unit of which is GPa

A-coefficient factor

B-sound wave factor

C-resilience factor $V_L$-ultrasonic width-direction velocity, the unit of which is m/s $V_h$-ultrasonic thickness-direction velocity, the unit of which is m/s R-resilience value By means of data processing analysis, $A=e^{1.5853}$, $B=1.3453$, $C=0.2523$, and the elastic modulus testing model is:

$$E = e^{1.5853}\left(\frac{V_L}{V_h}\right)^{1.3453} \times R^{0.2523}$$

According to the above-mentioned testing steps, other batches of $Al_2O_3$ fine ceramic of a size of 150 mm×150 mm are randomly selected for verification. Inferential values of the elastic moduli obtained by performing calculation by using the resilience values and the ultrasonic velocities are compared with actually tested values of the elastic moduli to verify the reliability of the testing method and the fitting equation. Comparison of test results is as shown in Table 2.

TABLE 2

Verification of test results of the resilience values, the ultrasonic velocities and the elastic moduli of the $Al_2O_3$ fine ceramic

| Serial number | 1 | 2 | 3 | 4 | 5 | 6 |
|---|---|---|---|---|---|---|
| Resilience value R | 22 | 24 | 25 | 29 | 31 | 33 |
| Ultrasonic propagation velocity (in a thickness direction) m/s | 7362.12 | 7633.85 | 8003.62 | 8846.72 | 8903.55 | 9037.26 |

TABLE 2-continued

Verification of test results of the resilience values, the ultrasonic velocities and the elastic moduli of the $Al_2O_3$ fine ceramic

| Serial number | 1 | 2 | 3 | 4 | 5 | 6 |
|---|---|---|---|---|---|---|
| Ultrasonic propagation velocity (in a width direction) m/s | 980.22 | 993.58 | 1018.92 | 1052.36 | 1066.71 | 1107.67 |
| Inferential values of the elastic moduli GPa | 187.75 | 209.86 | 220.48 | 264.63 | 290.00 | 317.26 |
| Actually tested values of the elastic moduli GPa | 185.62 | 210.37 | 224.82 | 258.77 | 296.54 | 327.96 |

Verification shows that a largest error is 3.4%, which indicates that the error is smaller.

Referring to FIG. 3, the present disclosure further provides an apparatus, which includes a memory 20, a processor 10, and a non-destructive testing program for an elastic modulus of fine ceramic that is stored on the memory 20 and is operable on the processor 10. The non-destructive testing program for an elastic modulus of fine ceramic, when executed by the processor, realizes the steps of the above-mentioned non-destructive testing method for an elastic modulus of fine ceramic, specifically as mentioned above.

The present disclosure further provides a storage medium. The storage medium stores a computer program which can be executed to implement the above-mentioned non-destructive testing method for an elastic modulus of fine ceramic, specifically as mentioned above.

According to the above, in the non-destructive testing method for an elastic modulus of fine ceramic, the apparatus and the storage medium, by means of building the relational formulas and curves of the resilience value, the ultrasonic velocity and the elastic modulus of the fine ceramic material, the elastic modulus of the fine ceramic material is calculated and inferred by using the resilience value and the ultrasonic velocity. Non-destructive testing of the test sample is realized, and higher accuracy and correlation are further achieved; and the sample capacity of the test sample can also be enlarged according to the steps of the present disclosure to obtain relevant formulas.

It should be understood that the application of the present disclosure is not limited to the above-mentioned examples. Those of ordinary skill in the art can make improvements or transformations according to the above illustrations, and all these improvements and transformations shall fall within the protection scope of the claims appended.

What is claimed is:

1. A non-destructive testing method for an elastic modulus of fine ceramic, comprising:
controlling intact fine ceramic to enter a first testing position, fixing the test sample, controlling an ultrasonic testing instrument to be adjusted to a specified position of the test sample, performing ultrasonic testing on the test sample, and collecting ultrasonic testing data;

adjusting the test sample to a second testing position, performing resilience testing on the test sample, and collecting resilience testing data; and building a data model according to the ultrasonic testing data and the resilience testing data, or substituting the ultrasonic testing data and the resilience testing data into the pre-built data model to obtain elastic modulus characterization data of the test sample.

2. The non-destructive testing method for the elastic modulus of the fine ceramic according to claim 1, wherein before controlling the intact fine ceramic to enter the first testing position, fixing the test sample, controlling the ultrasonic testing instrument to be adjusted to the specified position of the test sample, performing ultrasonic testing on the test sample, and collecting the ultrasonic testing data, the method further comprises:

pre-constructing an ultrasonic and resilience two-parameter-based non-destructive testing system for an elastic modulus of fine ceramic; and the non-destructive testing system for an elastic modulus of fine ceramic comprises an automatic control and testing mechanism and a data processing mechanism; and the automatic testing mechanism comprises a sample installation component and a resilience testing component.

3. The non-destructive testing method for the elastic modulus of the fine ceramic according to claim 2, wherein the controlling of the intact fine ceramic to enter the first testing position, fixing the test sample, controlling the ultrasonic testing instrument to be adjusted to the specified position of the test sample, performing ultrasonic testing on the test sample, and collecting the ultrasonic testing data comprises:

putting the fine ceramic into the sample installation component for fixing, controlling an ultrasonic transmitter and an ultrasonic receiver of the ultrasonic testing instrument to be adjusted onto testing points of two opposite side surfaces of the fine ceramic;

connecting the ultrasonic testing instrument to the data processing mechanism in a communication manner, testing time difference, wave velocity and amplitude data at the signal receiving moments of the transmitting probe and the receiving probe of the ultrasonic testing instrument, and collecting the time difference, wave velocity and amplitude data serving as ultrasonic testing data; and performing ultrasonic testing on points to be tested on all the side surfaces of the test sample.

4. The non-destructive testing method for the elastic modulus of the fine ceramic according to claim 2, wherein the test sample is adjusted to the second testing position, resilience testing is performed on the test sample, and resilience testing data is collected;

the fine ceramic is adjusted to a position located on the same horizontal plane as a resilience testing rod of the resilience testing component;

testing points are arranged at an equal interval on a center line of each side surface of the fine ceramic in a thickness direction; and the resilience testing rod is controlled to be perpendicular to the testing points to test resilience values of all the testing points, and the resilience testing data of all the side surfaces of the test sample is collected.

5. The non-destructive testing method for the elastic modulus of the fine ceramic according to claim 2, wherein the building of the data model according to the ultrasonic testing data and the resilience testing data, or substituting the ultrasonic testing data and the resilience testing data into the pre-built data model to obtain the elastic modulus characterization data of the test sample comprises:

the automatic control and testing mechanism obtaining the ultrasonic testing data and the resilience testing data, and recording the data into the data processing mechanism; and building the data model, or substituting the data into the pre-built data model for formula and corresponding amount conversion to obtain the elastic modulus characterization data of the test sample.

6. The non-destructive testing method for the elastic modulus of the fine ceramic according to claim 2, wherein the test sample is pretreated before testing, and the step of pretreatment comprises:

selecting at least 5 groups of test samples with different mechanical properties from fine ceramic to be tested, each group comprising at least 8 fine ceramic test samples with the mechanical properties, and placing the selected test samples into an environment with a temperature of 20° C.±2° C. and a relative humidity of 60%±5% for standing and curing for 48 h to obtain test samples;

ultrasonic testing and resilience testing of each test sample specifically comprise steps of:

at least 8 testing points that are distributed at an equal interval are uniformly selected, in advance, on each side surface of each test sample;

ultrasonic testing is performed once on the testing points to obtain an ultrasonic width-direction velocity $V_L$ and an ultrasonic thickness-direction velocity $V_h$ of each testing point;

resilience testing is performed once on the testing points to obtain each resilience value R; and a mean value of the read ultrasonic width-direction velocities $V_L$ is taken as an ultrasonic width-direction velocity effective value of the test samples; a mean value of the ultrasonic thickness-direction velocities $V_h$ is taken as an ultrasonic thickness-direction velocity effective value of the test samples; and a mean value of the resilience values R is taken as a resilience effective value of the test samples.

7. The non-destructive testing method for the elastic modulus of the fine ceramic according to claim 2, wherein the data model is $$E = A\left(\frac{V_L}{V_h}\right)^B \cdot R^C$$

wherein,

E is the elastic modulus, the unit of which is GPa;

A is a coefficient factor, a value range of which is $e^{1.1}$-$e^{3.4}$;

B is a sound wave factor, a value range of which is 0-2.7;

C is a resilience factor, a value range of which is 0-1.0;

$V_L$ is the ultrasonic width-direction velocity, the unit of which is m/s;

$V_h$ is the ultrasonic thickness-direction velocity, the unit of which is m/s; and R is the resilience value.

8. The non-destructive testing method for the elastic modulus of the fine ceramic according to claim 2, further comprising:

performing testing according to the grades of the mechanical property to form a regression analysis sample, and fitting and creating a relation curve of resilience-ultrasonic for testing the elastic modulus of the fine ceramic;

using the built data model according to the obtained resilience effective value and the ultrasonic effective values to perform calculation and analysis to obtain the elastic modulus E; and obtaining an effective numerical value of the elastic modulus E of each test sample in each group, and taking an arithmetic mean value as the elastic modulus E' of the group of test samples.

9. An apparatus, comprising a memory, a processor, and a non-destructive testing program for an elastic modulus of fine ceramic that is stored on the memory and is operable on the processor, wherein the non-destructive testing program for an elastic modulus of fine ceramic, when executed by the processor, realizes the steps of the non-destructive testing method for an elastic modulus of fine ceramic according to claim 1.

10. A storage medium, wherein the storage medium stores a computer program which may be executed to implement the non-destructive testing method for according to claim 1.

\* \* \* \* \*